(12) United States Patent
Imai (10) Patent No.: US 8,493,677 B2
(45) Date of Patent: Jul. 23, 2013

(54) LENS UNIT AND METHOD OF MAKING THE SAME

(75) Inventor: Hideyuki Imai, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 13/564,619

(22) Filed: Aug. 1, 2012

(65) Prior Publication Data

US 2012/0293880 A1 Nov. 22, 2012

Related U.S. Application Data

(63) Continuation of application No. PCT/JP2011/052818, filed on Feb. 10, 2011.

(30) Foreign Application Priority Data

Feb. 25, 2010 (JP) ................................ 2010-040041

(51) Int. Cl.
*G02B 7/02* (2006.01)

(52) U.S. Cl.
USPC ............................ 359/819; 359/811; 359/894

(58) Field of Classification Search
USPC .................. 359/811, 819, 894; 29/34 R, 238, 29/413, 421.1, 425, 428, 432, 526.2, 526.3, 29/530, 557
See application file for complete search history.

(56) References Cited

U.S. PATENT DOCUMENTS

| 4,162,826 | A | * | 7/1979 | Van der Beck et al. | ....... 359/894 |
| 4,200,794 | A | * | 4/1980 | Newberry et al. | ..... 250/396 ML |
| 8,294,229 | B2 | * | 10/2012 | Kang et al. | .................... 257/432 |

FOREIGN PATENT DOCUMENTS

| JP | 10-29825 | 2/1998 |
| JP | 2001-162345 | 6/2001 |
| JP | 2006-13358 | 1/2006 |
| JP | 2007-52096 | 3/2007 |
| JP | 2008-199768 | 8/2008 |
| JP | 2009-251463 | 10/2009 |
| JP | 2010-8800 | 1/2010 |

OTHER PUBLICATIONS

Search Report dated Mar. 15, 2011 from International Application No. PCT/JP2011/052818.

* cited by examiner

*Primary Examiner* — Loha Ben

(74) *Attorney, Agent, or Firm* — Beyer Law Group LLP (57) ABSTRACT

A lens unit includes a lens holder of stainless steel and a converging lens fixed to a lens holding hole of the lens holder. The lens holder is formed by pressing, or stamping from a metal plate, made of a compressed stainless steel plate material, having a predetermined thickness with a narrow tolerance. Upon stamping, the metal plate is fractured, thus forming an outer tapered surface at one end of the outer surface of the lens holder. When the outer surface and the rear end surface of the lens holder are allowed to abut against a positioning recess in order to position the lens holder, the outer tapered surface is opposed to the corner of the positioning recess.

13 Claims, 6 Drawing Sheets

LENS UNIT AND METHOD OF MAKING THE SAME

CLAIM OF PRIORITY

This application is a Continuation of International Application No. PCT/JP2011/052818 filed on Feb. 10, 2011, which claims benefit of Japanese Patent Application No. 2010-040041 filed on Feb. 25, 2010. The entire contents of each application noted above are hereby incorporated by reference.

BACKGROUND OF THE INVENTION

1. Field of the Invention

The present invention relates to lens units to be installed on optical devices, and in particular, relates to a lens unit including a metal lens holder worked with high dimensional accuracy at low cost and a method of making the lens unit.

2. Description of the Related Art

Optical devices used for optical communication are equipped with positioned lens units each including a lens holder and a lens fixed to the lens holder.

Japanese Unexamined Patent Application Publication No. 2007-52096 discloses a lens unit that includes a lens barrel that comprises polycarbonate and lenses held by the lens barrel such that the lenses are press-fitted in the lens barrel.

Japanese Unexamined Patent Application Publication No. 10-29825 discloses a method of making a lens unit that includes a metal lens barrel. According to this method, a glass material is supplied into the lens barrel, the glass material is heated to a glass transition point and is then pressed to form a lens, and the formed lens is secured to the inside of the lens barrel. As regards a material for the lens barrel, stainless steel is selected as a metal material having a coefficient of linear expansion (hereinafter, "linear expansion coefficient") minimally different from that of the glass material. A predetermined length piece of a stainless steel cylinder is cut off using a slicer. The glass material is press-fitted into a center hole of the piece, thus forming the lens.

As regards the lens unit disclosed in Japanese Unexamined Patent Application Publication No. 2007-52096, since the synthetic resin lens barrel is deformed when the lenses are pressed into the lens barrel, it is difficult to increase the dimensional accuracy of the entire lens unit. Furthermore, since the dimensional accuracy of the outside shape of the lens barrel is unstable, it is also difficult to increase the positioning accuracy relative to an optical device.

The lens unit disclosed in Japanese Unexamined Patent Application Publication No. 10-29825 includes the metal lens barrel. Accordingly, the dimensional accuracy of, for example, the diameter of the outer surface of the lens barrel can be increased higher than that in a synthetic resin lens barrel. Since the lens barrel is formed by slicing the metal cylinder, however, further cutting has to be performed in order to form a tapered surface in the center hole or an outer tapered surface at one end of the outer surface. Disadvantageously, the cost of production is increased.

Furthermore, formation of the lens barrel using stainless steel by cutting requires longer cutting time. Disadvantageously, the life of a cutting tool, such as a tool bit, will be shortened. The use of free-cutting stainless steel leads to relatively easy cutting but may adversely affect the environment, because the free-cutting stainless steel contains lead.

SUMMARY OF THE INVENTION

The present invention is intended to overcome the above-described disadvantages and provides a lens unit including a lens holder having an accurately determined length between the front end surface and the rear end surface of the holder.

The present invention further provides a method of making a lens unit including a lens holder made of a metal material, the lens holder being formed with dimensional accuracy by pressing.

According to an aspect of the present invention, a lens unit includes a lens holder having a front end surface, a rear end surface, an outer surface, and a lens holding hole extending from the front end surface to the rear end surface, and a lens held in the lens holder. The lens holder is a member stamped from a metal plate compressed to a predetermined thickness, and the compressed thickness determines the length between the front end surface and the rear end surface.

According to this aspect of the present invention, the lens unit can be formed by pressing from a metal plate. Furthermore, the dimension between the front end surface and the rear end surface can be determined with high accuracy.

The outer surface may have an outer tapered surface at one end, the outer tapered surface being formed by metal fracture upon stamping from the metal plate. The outer tapered surface may be a portion to be opposed to the corner of a positioning recess when the lens holder is positioned in the positioning recess.

With the above structure, it is therefore unnecessary to machine the outer surface in order to form the outer tapered surface to be opposed to the positioning recess. Advantageously, the lens holder can be made at low cost.

According to another aspect of the present invention, a method of making a lens unit includes the steps of (a) compressing a metal plate to a predetermined thickness, (b) stamping a disk from the compressed metal plate, (c) punching a lens holding hole at the center of the disk to form a lens holder before, after, or simultaneously with the step (b), and (d) fixing a lens to the lens holding hole.

According to this aspect of the present invention, since the lens holder can be formed by pressing, the cost of production can be reduced, so that the lens unit is suitable for mass production. Although commercially available metal plates have thicknesses determined in a stepwise manner, the lens holder having an intended thickness can be formed because the metal plate is pressed and compressed in thickness in the step (a). Furthermore, although commercially available metal plates each have a wide thickness tolerance, the lens holder, which has been stamped from the metal plate, has a narrow tolerance of thickness along an optical axis, because the metal plate has been compressed in thickness.

In the step (b), an outer tapered surface may be formed at one end of the outer surface of the disk by metal fracture. The outer tapered surface may be a portion to be opposed to the corner of a positioning recess when the lens holder is positioned in the positioning recess.

Since the outer tapered surface is formed by metal fracture upon pressing, or stamping, it is unnecessary to cut the outer surface in order to form the outer tapered surface. Furthermore, when the outer tapered surface is opposed to the corner of the positioning recess of an optical device, the lens holder can be positioned in the positioning recess while being allowed to abut against the recess.

The method may further include forming an inner tapered surface at one end of the lens holding hole after or simultaneously with the step (c), the inner tapered surface having a diameter increasing outwardly.

Since the inner tapered surface can be formed by pressing, cutting is not necessary. Advantageously, the production cost can be reduced.

Preferably, the metal plate is lead-free stainless steel.

Specifically, since the lens unit is formed by pressing, it is unnecessary to use free-cutting stainless steel containing lead.

In the step (d), a glass material may be supplied into the lens holding hole and the glass material may be heated and compressed to form the lens.

In the use of the lens holder made of stainless steel, since the difference in linear expansion coefficient between the lens holder and the lens can be reduced, the lens can be reliably held in the lens holder. Furthermore, the completed glass lens may be placed and fixed to the lens holding hole.

According to the above-described aspects of the present invention, since the lens holder is formed by pressing from a metal plate, the production cost can be reduced. In addition, since the metal plate is compressed in thickness in the first step, the thickness (length) of the completed lens holder along the optical axis can be freely set. Furthermore, the thickness (length) thereof can be set to a highly accurate value with a narrow tolerance.

DESCRIPTION OF THE PREFERRED EMBODIMENTS

Figure 1:
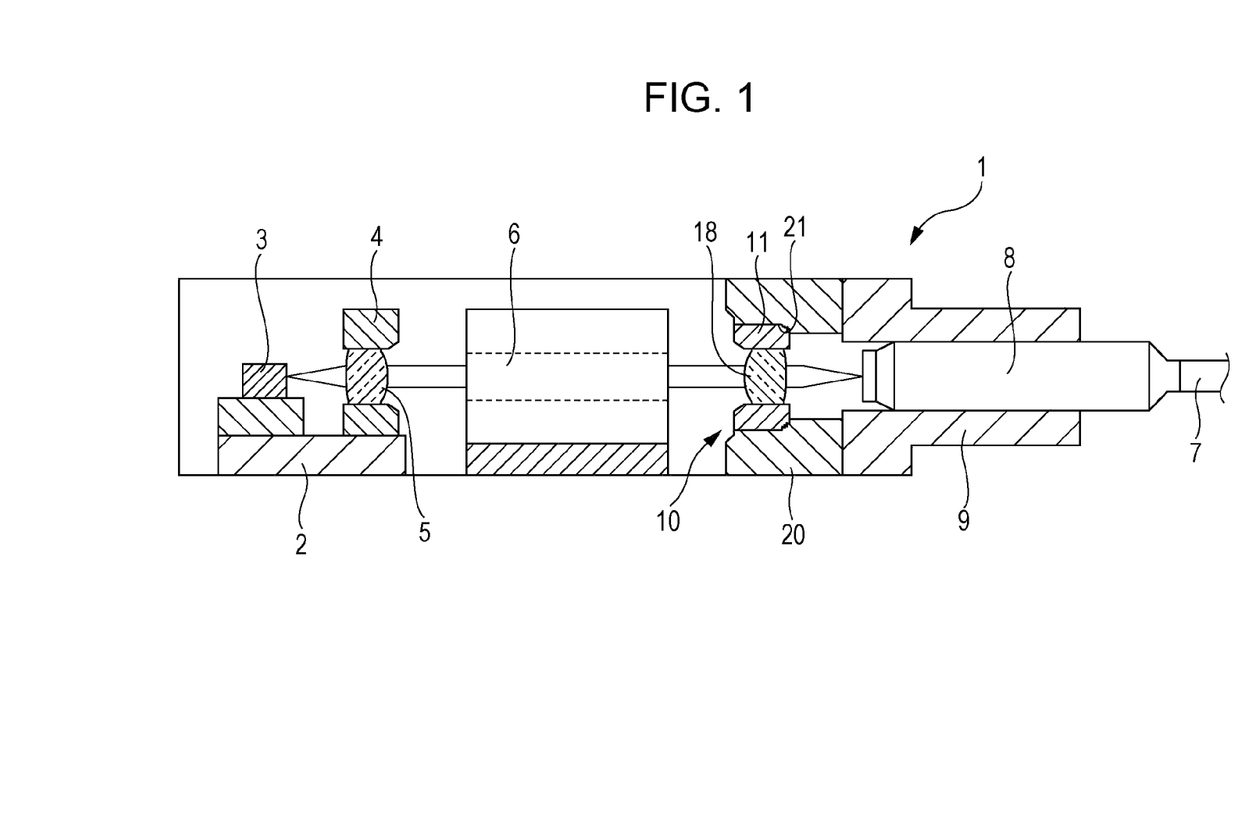
FIG. 1 is a schematic diagram of an optical device including a lens unit according to an embodiment of the present invention.

FIG. 1 schematically illustrates the structure of a light emitting device 1, as an example of optical devices. The light emitting device 1 is used as an optical communication device, for example.

In the light emitting device 1, a light emitting element 3, such as a light emitting diode, is fixed on a base 2. A collimating lens 5 is placed in front of the light emitting element 3. The collimating lens 5 is held by a lens holder 4, which is fixed on the base 2. Light emitted from the light emitting element 3 passes through the collimating lens 5 such that it is collimated and the collimated light enters an optical isolator 6.

A connector 9 is fixed to the right end of the light emitting device 1. A plug 8 fixed to the distal end of an optical fiber 7 is attached to the connector 9.

The collimated light passes through the optical isolator 6 and is focused on an end surface of the optical fiber 7 through a converging lens 18 included in a lens unit 10 without returning to the light emitting element 3, so that the light enters the optical fiber 7.

The lens unit 10 includes the converging lens 18 and a lens holder 11 which holds the converging lens 18. The lens holder 11 is positioned and fixed in a support 20 included in the light emitting device 1. The converging lens 18 is positioned such that the optical axis of the converging lens 18 coincides with that of the optical fiber 7 and converged light is focused on the end surface of the optical fiber 7.

Figure 2:
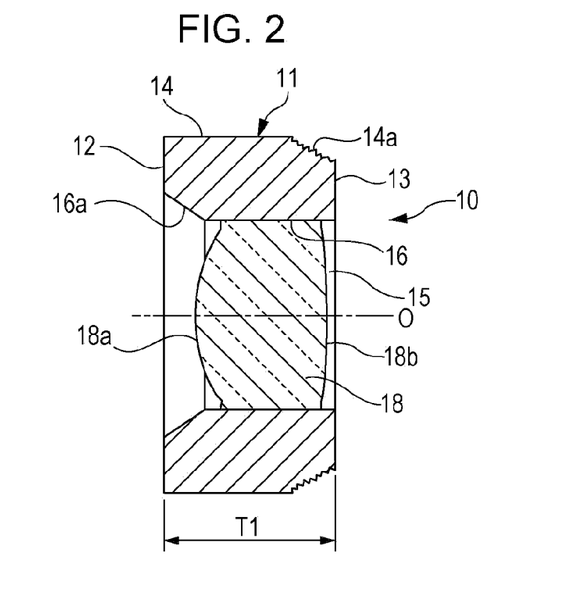
FIG. 2 is a cross-sectional view of the lens unit according to the embodiment of the present invention.

FIG. 2 illustrates the cross-section of the lens unit 10. The lens holder 11 comprises metal and the converging lens 18 comprises glass. Preferably, a metal material of the lens holder 11 has a linear expansion coefficient approximate to that of a glass material of the converging lens 18. More preferably, the metal material is free from lead in consideration of the environment. For example, ferritic stainless steel, such as SUS430, is used.

The lens holder 11 has a front end surface 12 at the light entrance end and a rear end surface 13 at the light exist end. The front end surface 12 is parallel to the rear end surface 13. The distance, T1, between the front end surface 12 and the rear end surface 13, namely, the thickness (or length) T1 along the optical axis, indicated by O, is in the range of approximately 1 to approximately 2 mm, for example, 1.6 mm. The lens holder 11 has an outer surface 14, serving as a curved surface centered on the optical axis O of the converging lens 18. The outer surface 14 is continuous with an outer tapered surface 14a at the light exit end (on the right in FIG. 2). The outer tapered surface 14a has a diameter gradually decreasing toward the light exit end. The outer tapered surface 14a is a fractured surface of metal broken upon stamping, which will be described later. The outer tapered surface 14a has a surface roughness greater than that of the outer surface 14.

The lens holder 11 has a lens holding hole 15 which extends from the front end surface 12 to the rear end surface 13. The lens holding hole 15 has a surface, serving as an inner surface 16, which is a curved surface centered on the optical axis O. The lens holder 11 has an inner tapered surface 16a continuous with the inner surface 16 at the light entrance end. The inner tapered surface 16a has a diameter gradually increasing outwardly toward the light entrance end.

The converging lens 18, formed in the lens holding hole 15 by pressing, is fixed to the inner surface 16, serving as the curved surface.

Figure 3:
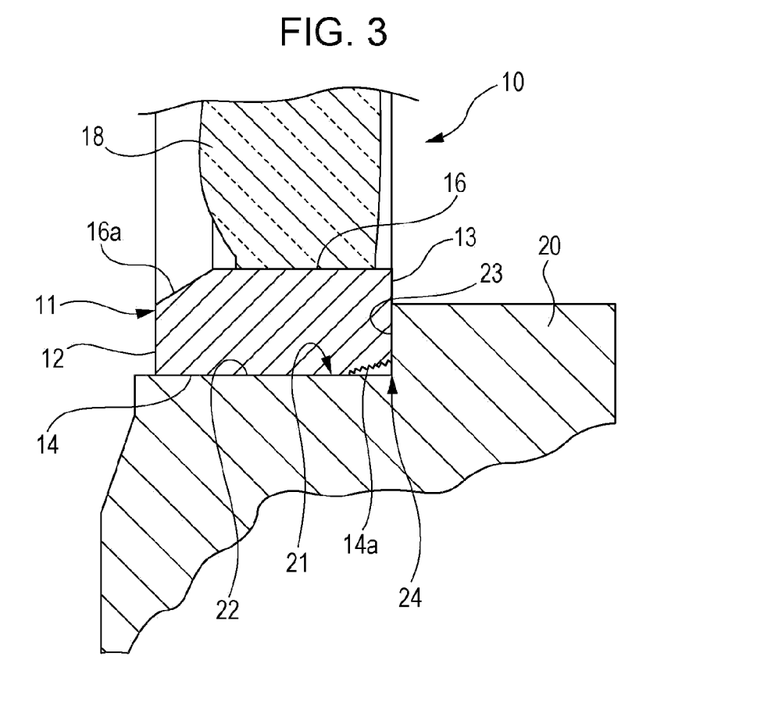
FIG. 3 is a cross-sectional view of part of a lens unit positioning structure in the optical device.

Referring to FIG. 1, the support 20, included in the light emitting device 1, has a ring-shaped positioning recess 21. Referring to FIG. 3, the positioning recess 21 has an inner fitting surface 22 which is a curved surface centered on the optical axis O and a ring-shaped abutment surface 23 which extends perpendicular to the optical axis O so as to surround the optical axis O. The outer surface 14 of the lens holder 11 is fitted with a minimum clearance on the inner fitting surface 22 and the rear end surface 13 abuts against the abutment surface 23, so that the lens holder 11 is positioned and fixed to the support 20. Since the outer tapered surface 14a is opposed to the corner, indicated by 24, between the inner fitting surface 22 and the abutment surface 23 of the positioning recess 21, the rear end surface 13 can be positioned in tight contact with the abutment surface 23 with reliability. The lens holder 11 is positioned while being fitted in the positioning recess 21 and the lens holder 11 and the support 20 are fixed by bonding or welding.

A method of making the lens holder 11 and a method of making the lens unit 10 will now be described.

Figure 4A:
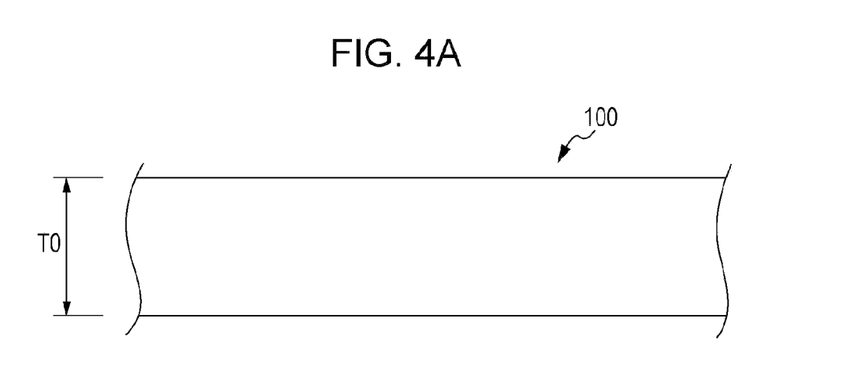
FIGS. 4A and 4B are diagrams explaining compression of a metal plate material in thickness.

FIG. 4A illustrates a metal plate material 100. This metal plate material 100 is a metal material having a linear expansion coefficient minimally different from that of the glass material of the converging lens 18. Specifically, the metal plate material 100 is a stainless steel plate. A lead-free stainless steel plate, which is typically unstable to be cut, can be used. The thickness, T0, of the metal plate material 100 is predetermined upon production. The thickness T0 has a wide tolerance.

Figure 4B:
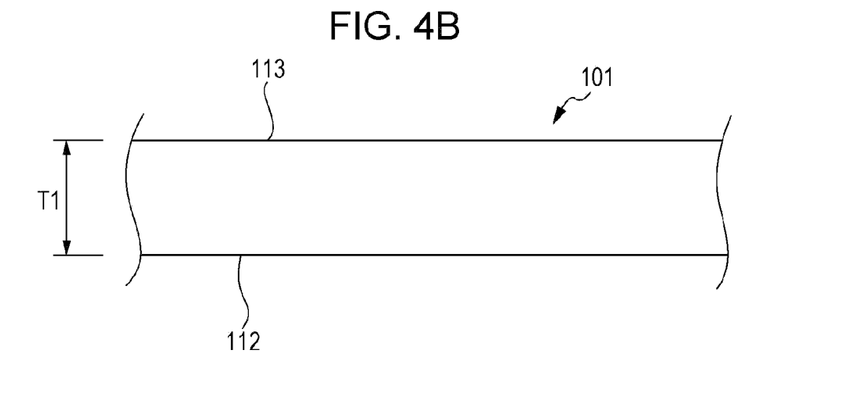

The metal plate material 100 is compressed in thickness by compression pressing such that the thickness is reduced, thus obtaining a metal plate 101 having a thickness T1 as illustrated in FIG. 4B. The metal plate 101 has a lower surface 112 and an upper surface 113 which are flat. The thickness T1 of the metal plate 101 is adjusted so as to coincide with the thickness of the lens holder 11 to be made. The tolerance of the thickness T1 of the compressed metal plate 101 is sufficiently narrower than that of the thickness T0 of the metal plate material 100 of FIG. 4A. For example, the thickness T0 of the metal plate material 100 is a nominal dimension of 20 mm and the thickness T1 of the compressed metal plate 101 is 1.6 mm.

Figure 5:
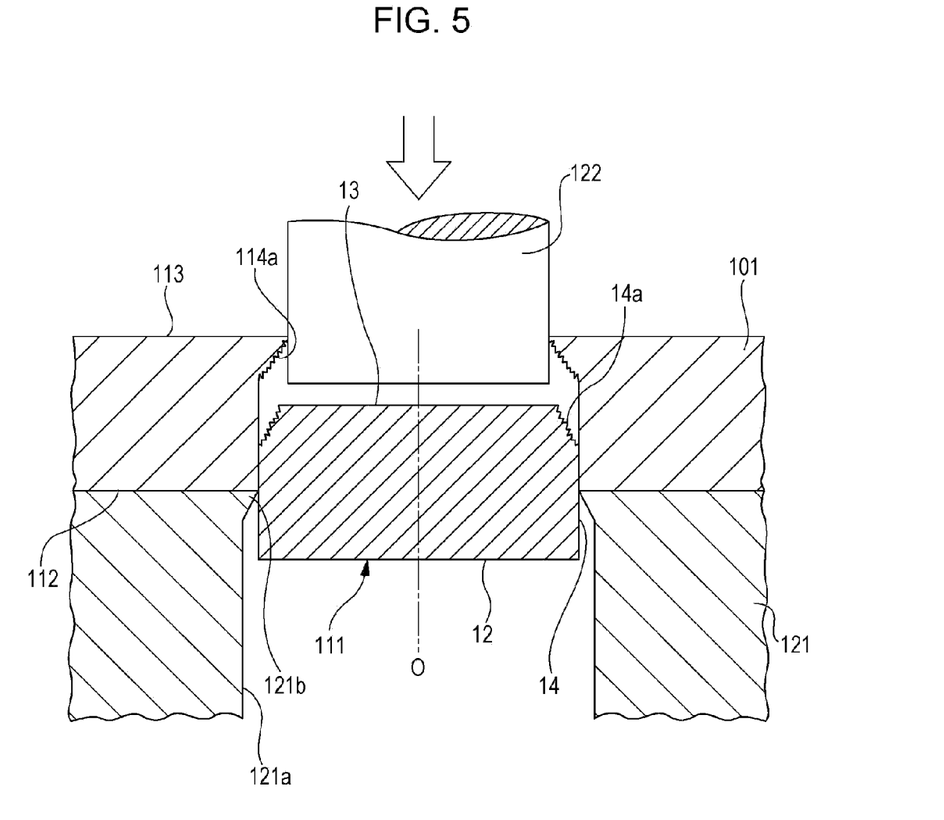
FIG. 5 is a diagram explaining stamping of a disk.

FIG. 5 illustrates punching in which a die 121 and a punch 122 are used. The die 121 has a perforation 121a and a cutting blade 121b positioned at the upper edge of the perforation 121a. The metal plate 101 having the thickness T1 is placed on the die 121 and the upper surface 113 of the metal plate 101 is punched with the punch 122, so that a disk 111 is stamped from the metal plate 101.

The stamped disk 111 has a surface formed by cutting with the cutting blade 121b of the die 121 and this surface serves as the outer surface 14. Part adjacent to the upper surface 113 of the metal material is fractured and this part serves as a fractured portion 114a. A fractured surface, which is continuous with the outer surface 14, of the disk 111 serves as the outer tapered surface 14a. The outer tapered surface 14a, serving as a portion which is not cut by the cutting blade 121b and is separated from the metal plate 101 by fracture, is rougher than the outer surface 14. The diameter of the outer tapered surface 14a decreases toward the upper surface 113 of the metal plate 101. The disk 111 has the front end surface 12 and the rear end surface 13. The distance between the front end surface 12 and the rear end surface 13 is equal to the thickness T1 of the metal plate 101.

Figure 6A:
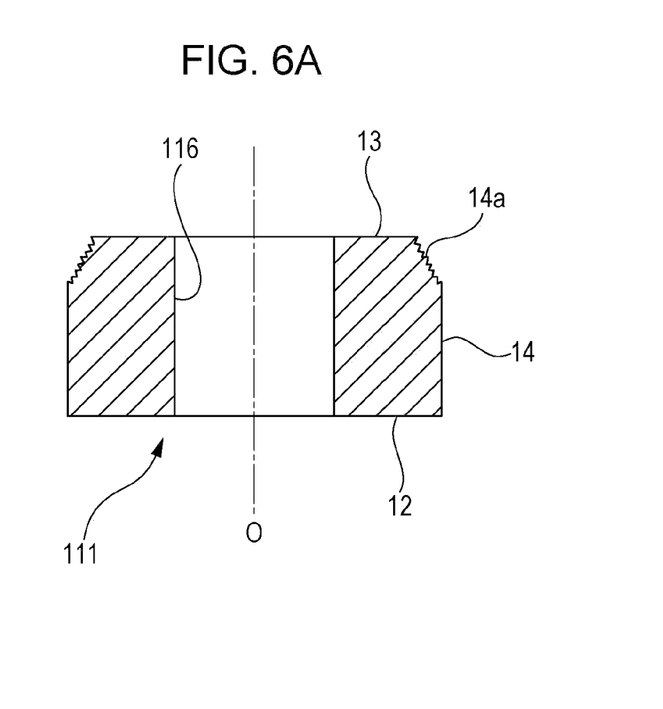
FIGS. 6A and 6B are diagrams explaining formation of a lens holding hole.
Figure 6B:
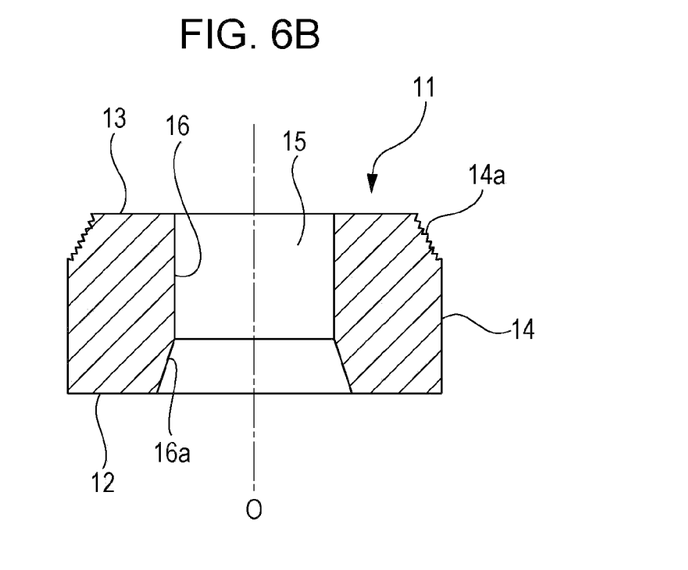
Figure 7:
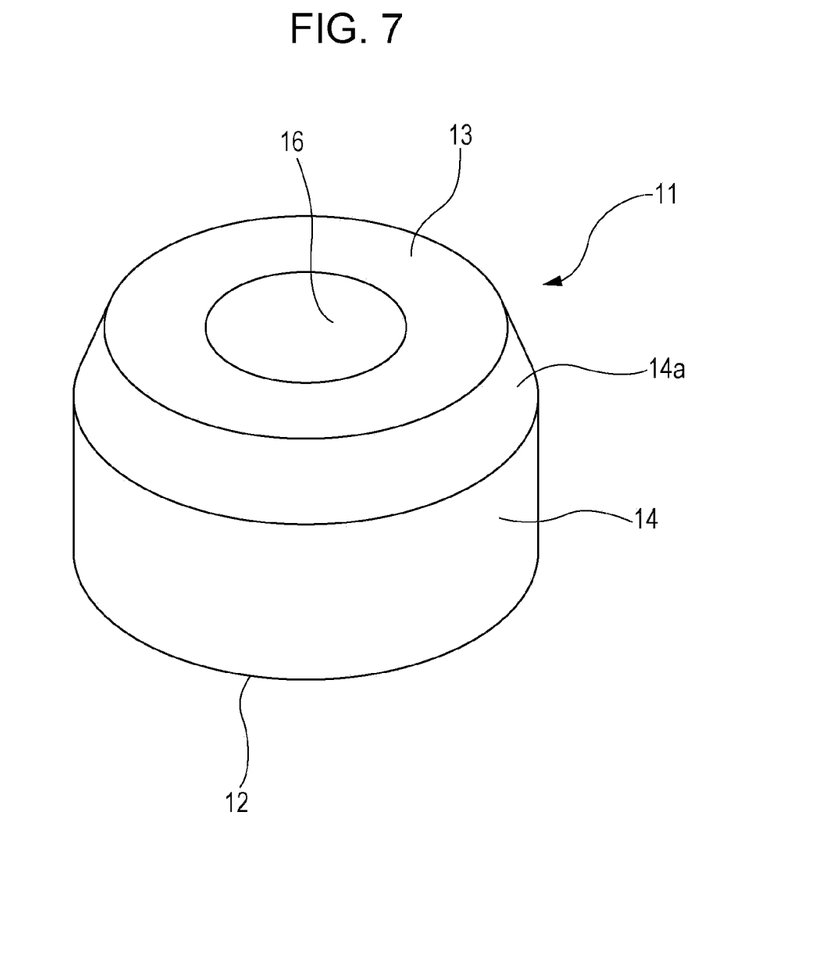
FIG. 7 is a perspective view of a completed lens holder.

FIG. 6A illustrates formation of a center hole 116 in the disk 111. The center hole 116 is formed by pressing, or punching. Referring to FIG. 6B, a punch is pressed onto the edge of the center hole 116 adjacent to the front end surface 12 to increase an opening, thus forming the inner tapered surface 16a. Simultaneously, the inner surface of the center hole 116 is increased using a punch such that the inside diameter is adjusted, thus forming the lens holding hole 15. Consequently, the lens holder 11 is completed as illustrated in FIG. 7.

The completed lens holder 11 is subjected to lens formation. In the lens formation, the lens holder 11 is held in a mold and the glass material is supplied into the lens holding hole 15. The lens holder 11 and the lens material are heated together. When the lens material is heated to the glass transition point or hither, the lens material is pressurized in up-down directions with pressing molds, thus forming the converging lens 18 having a light-entrance optical surface 18a and a light-exit optical surface 18b.

The compression of the metal plate material 100 illustrated in FIGS. 4A and 4B enables the thickness T1 of the metal plate 101 to be a highly accurate dimension having a narrow tolerance, such that the distance T1 between the front end surface 12 and the rear end surface 13 in the lens holder 11, namely, the thickness (or length) T1 along the optical axis O is accurately determined When the lens holder 11 is placed in the mold for lens formation, therefore, the lens holder 11 can be accurately positioned along the optical axis. Consequently, upon press molding of the converging lens 18 in the lens holding hole 15, the distance between the rear end surface 13, serving as a positioning reference surface, of the lens holder 11 and each of the optical surfaces 18a and 18b of the converging lens 18 can be accurately determined.

Referring to FIG. 2, in the lens unit 10 in which the converging lens 18 is held in the lens holder 11, the distance between the rear end surface 13 and the optical surface 18b is short but the distance between the front end surface 12 and the optical surface 18a is long. Since the inner tapered surface 16a is positioned in front of the optical surface 18a of the converging lens 18, the inner surface 16 of the lens holding hole 15 casts no shadow on the optical surface 18a when collimated light enters the optical surface 18a.

Furthermore, each of the optical surfaces 18a and 18b of the completed converging lens 18 is coated with an antireflective film by vapor deposition. At this time, since the inner tapered surface 16a is provided, the antireflective film can be easily formed on the entire optical surface 18a upon vapor deposition.

In the above-described embodiment, the converging lens 18 is press-molded in the lens holding hole 15 of the lens holder 11. A glass lens completed by a process different from the process of making the lens holder 11 may be inserted into the lens holding hole 15 of the lens holder 11 and be fixed thereto.

What is claimed is:

1. A lens unit comprising:
a lens holder having a front end surface, a rear end surface, an outer surface, and an inner surface defining a lens holding hole extending from the front end surface to the rear end surface; and
a lens held in the lens holder,
wherein the lens holder is a member stamped from a metal plate compressed to a predetermined thickness, and the compressed thickness determines the length between the front end surface and the rear end surface.

2. The lens unit according to claim 1,
wherein the outer surface has an outer tapered portion at one end, the outer tapered portion being a fractured surface formed by metal fracture upon stamping from the metal plate, and
wherein the outer tapered portion is configured to face a corner of a positioning recess when the lens holder is positioned in the positioning recess.

3. The lens unit according to claim 2,
wherein the fractured surface of the outer tapered portion has a surface roughness greater than that of the outer surface other than the tapered portion.

4. The lens unit according to claim 2,
wherein the lens holder is configured to fit in the positioning recess having an inner fitting surface, an abutment surface, and the corner formed therebetween, such that the outer surface other than the outer tapered portion fits the inner fitting surface and the outer tapered portion faces the corner so as to allow the rear end surface abuts the abutment surface.

5. A method of making a lens unit, comprising the steps of:
(a) compressing a metal plate to a predetermined thickness;
(b) stamping a disk from the compressed metal plate;
(c) forming a lens holder by punching a lens holding hole at the center of the disk before, after, or simultaneously with the step (b); and
(d) fixing a lens to the lens holding hole to form the lens unit.

6. The method according to claim 5,
wherein in the step (b), the stamping forms an outer tapered portion having a fractured surface at one end of an outer surface of the disk by metal fracture.

7. The method according to claim 6, further comprising:
positioning the lens unit in a positioning recess such that the outer tapered portion faces a corner of the positioning recess.

8. The method according to claim 6,
wherein the fractured surface of the outer tapered portion has a surface roughness greater than that of the outer surface other than the tapered portion.

9. The method according to claim 5, further comprising:
forming an inner tapered surface at one end of the lens holding hole after or simultaneously with the step (c), the inner tapered surface having a diameter increasing outwardly.

10. The method according to claim 5, wherein the metal plate comprises lead-free stainless steel.

11. The method according to claim 5, wherein the step (d) includes:
supplying a glass material into the lens holding hole; and
heating and compressing the glass material to form the lens.

12. A lens unit comprising:
a lens holder having a front end surface, a rear end surface, an outer surface, and an inner surface defining a lens holding hole extending from the front end surface to the rear end surface; and
a lens held in the lens holder,
wherein the outer surface of the lens holder includes an outer tapered portion at a rear end, the outer tapered portion having a fractured surface with a surface roughness greater than that of the outer surface other than the tapered portion.

13. The lens unit according to claim 12,
wherein the lens holder is configured to fit in a positioning recess having an inner fitting surface, an abutment surface, and a corner formed therebetween, such that the outer surface other than the outer tapered portion fits the inner fitting surface and the outer tapered portion faces the corner so as to allow the rear end surface abuts the abutment surface.

* * * * *